United States Patent
Newman

(10) Patent No.: US 6,176,281 B1
(45) Date of Patent: Jan. 23, 2001

(54) ROUTER GUIDE WITH ADJUSTABLE FRAME

(76) Inventor: Roger R. Newman, 20 Lytton Blvd., Toronto, Ontario (CA), M4R 1L1

( * ) Notice: Under 35 U.S.C. 154(b), the term of this patent shall be extended for 0 days.

(21) Appl. No.: 09/207,516

(22) Filed: Dec. 9, 1998

(51) Int. Cl.$^7$ ............................................. B27C 5/00
(52) U.S. Cl. ............................ 144/144.51; 144/144.1; 144/371; 409/130; 33/638
(58) Field of Search ..................... 144/144.1, 144.51, 144/144.52, 137, 371, 372; 409/125, 130, 181, 182; 33/427, 429, 562, 638

(56) References Cited

U.S. PATENT DOCUMENTS

| | | | |
|---|---|---|---|
| 3,985,168 | * 10/1976 | Lundquist | 144/144.5 GT |
| 4,281,694 | * 8/1981 | Gorman | 144/134 D |
| 4,294,297 | * 10/1981 | Kieffer | 144/134 D |
| 4,373,562 | * 2/1983 | Vernon | 144/144.5 R |
| 4,434,824 | * 3/1984 | Bussey | 144/134 D |
| 4,718,468 | * 1/1988 | Cowman | 144/134 D |
| 4,913,206 | * 4/1990 | Altinbasak | 144/371 |
| 5,040,581 | * 8/1991 | Takashima | 144/144.5 R |
| 5,048,580 | * 9/1991 | Smith | 144/134 D |
| 5,052,454 | * 10/1991 | Meinhardt | 144/144.5 R |
| 5,203,389 | * 4/1993 | Goodwin | 144/356 |
| 5,383,503 | * 1/1995 | Johnson | 144/144.5 R |

* cited by examiner

Primary Examiner—W. Donald Bray
(74) Attorney, Agent, or Firm—Bereskin & Parr

(57) ABSTRACT

The present invention provides an adjustable frame guide having a pair of first frame members and a pair of second frame members, the pair of first frame members and the pair of second frame members being connected by connection means to form a quadrilateral frame for guiding a hand-held router to rout various sizes and shapes of square, rectangular, and parallelogram shaped grooves or recesses. The quadrilateral frame has an inextensible joint connection at first ends of the first and second frame members, and an adjustable joint connection at second ends of first and second frame members. The adjustable joint connection is formed by overlapping and intersecting slots at the second ends of first and second frame members. In a second embodiment, the quadrilateral formed by the pair of first frame members and the pair of second frame members can be tilted to form a parallelogram shaped frame guide, or arranged in a trapezoid shape.

12 Claims, 16 Drawing Sheets

ROUTER GUIDE WITH ADJUSTABLE FRAME

FIELD OF THE INVENTION

This invention relates to a frame guide which enables a hand-held router to be used to rout various sizes and shapes of square, rectangular and parallelogram shaped grooves or recesses, in a controlled and precise manner, and on any size of workpiece.

BACKGROUND OF THE INVENTION

In order to rout various sizes of square and rectangular grooves and recesses, various designs for adjustable rectangular guides have been proposed. Examples of these designs are found in the literature including Spielman, P., *The New Router Handbook* (New York: Sterling Publishing Co., 1993) at pp. 211–212; and Spielman, P., *Router Jigs and Techniques* (New York: Sterling Publishing Co., 1988) at pp. 220–223. While these prior art designs teach an adjustable four-sided frame for guiding a router, they suffer from a number of limitations including the requirement of having to adjust each corner of the frame in order to set the desired length and width. In addition, these prior art framing guides are designed so that the router base rides on top of the frame guide members rather than the router base being contained within the frame guide members, thus requiring the router operator to hold the router partly on and partly off a supporting base. Furthermore, the rectangular frame guides found in the prior art do not allow any flexibility in routing grooves or recesses which are somewhat off-square, i.e. a parallelogram, or which do not have any parallel sides, i.e. a trapezoid. In addition, it is not possible or practical to use the prior art frame guides on surfaces which are vertical or angled.

SUMMARY OF THE INVENTION

The present invention provides a frame guide for use in conjunction with a hand-held router to form various sizes and shapes of square and rectangular grooves or recesses, and which is intended to overcome the limitations of prior art devices as identified above.

In a first aspect, the present invention provides an adjustable frame guide, defining a quadrilateral, having a first pair of sides and a second pair of sides with each second side extending between the first sides, the quadrilateral being for guiding a router having a base for sliding movement relative to the frame guide, the frame guide comprising:

a pair of first frame members extending along the first sides of the quadrilateral, each first frame member having first and second ends;

a pair of second frame members extending along second sides of the quadrilateral and each second frame member having first and second ends;

a joint formed between the first end of one first frame member and the first end of one second frame member, a joint formed between the first end of the other first frame member and the first end of the other second frame member, a joint formed between the second end of one first frame member and the second end of the other second frame member and a joint formed between the second end of the other first frame member and the second end of the one second frame member, the first and second frame members overlapping at the joints; and a connection means provided at each joint, wherein the connection means include slots in each of said frame members at respective second ends thereof, each of said slots forming an elongate aperture through one of said frame members at said respective second ends, said slots overlapping and intersecting at said joints formed at said second ends and, wherein, said connection means enable the frame members to be rigidly secured together and enable at least the length of each side of the quadrilateral to be adjusted.

Preferably, the first and second frame members of the adjustable frame guide includes a hole at respective first ends thereof, whereby there is one pair of joints with overlapping slots and another pair of joints with overlapping holes, the overlapping holes providing an inextendable joint, and the overlapping slots providing an adjustable joint enabling simultaneous adjustment of the length of all sides of the adjustable frame guide.

More preferably, the connection means, at each joint, includes an elongate shaft and clamping means for clamping overlapping ends of the first and second frame members together, the elongate shafts extending through the holes and the slots, to align the first and second frame members.

The elongate shafts can comprise screw shafts, wherein the clamping means comprises, for each joint, a screw head at one end of a corresponding screw shaft and a threaded fastening member rotatably mounted on the screw shaft at the other end thereof.

Conveniently, the second frame members extend over the top of the first frame members. However, it will be appreciated that each frame member could include one lower end and one upper end, with each joint then having one upper end on top of one lower end. In this manner, the first and second frame members do not obstruct one another, and enable free angular movement between the first and second frame members.

Preferably, the first frame members are generally elongate and include lower surfaces for abutting a workpiece and are of substantially uniform cross-section, and the second frame members are generally elongate and of substantially uniform cross-section and extend above the first frame members and wherein a guide block is mounted below each second frame member and has a lower surface generally coplanar with the lower surfaces of first frame members. The guide blocks also have an inner vertical surface generally coplanar with the inner vertical surface of each corresponding second frame members.

This arrangement provides the possibility of sometimes limiting pivotal movement at some of the corners, so as to ensure that corners are square. Thus, where two joints are formed solely by holes in the frame members, there is no possibility of extension. Then, when the guide blocks abut closely against the first frame members, a perpendicular end surface on the guide blocks will keep the frame members square. An adjustment in size of the rectangle defined by the frame guide will then occur at the other two joints. This is convenient, as it is then necessary to loosen only two joints to adjust the frame guide.

It will also be appreciated that for some applications, it is desirable to be able to pivot the frame members to angles other than square. Thus, the connection means provided at each joint can enable the first and second frame members to pivot relative to each other to enable the first and second frame members to form the sides of a parallelogram or trapezoid.

BRIEF DESCRIPTION OF THE DRAWINGS

For a better understanding of the present invention, and to show more clearly how it may be carried into effect, reference will now be made, by way of example, to the accompanying drawings which show a preferred embodiment of the present invention.

DETAILED DESCRIPTION OF THE INVENTION

Figure 1A:
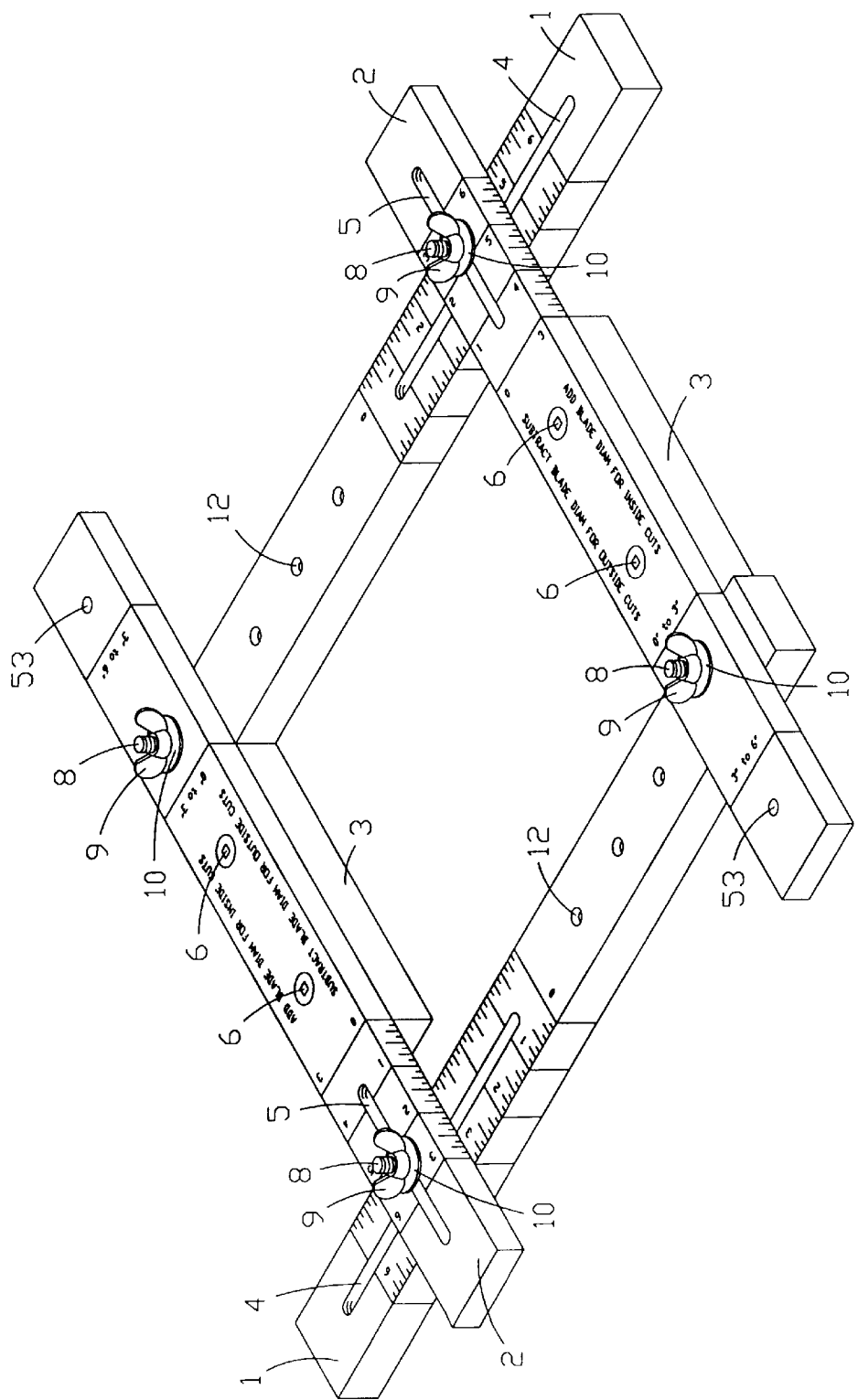
FIG. 1A shows a perspective view of a preferred embodiment of the frame guide of the present invention.
Figure 1B:
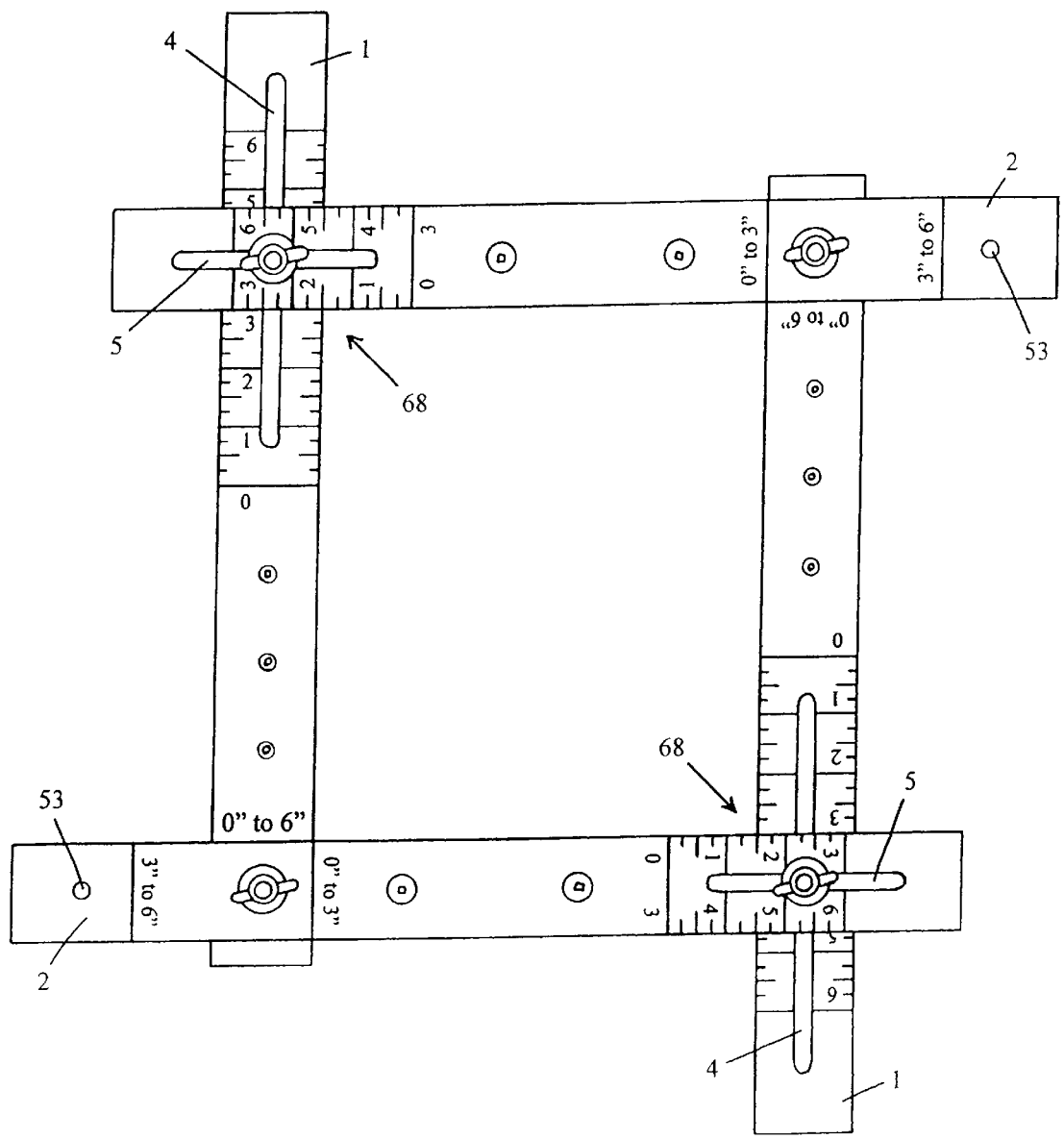
FIG. 1B shows a top view of the frame guide shown in FIG. 1A.
Figure 2:
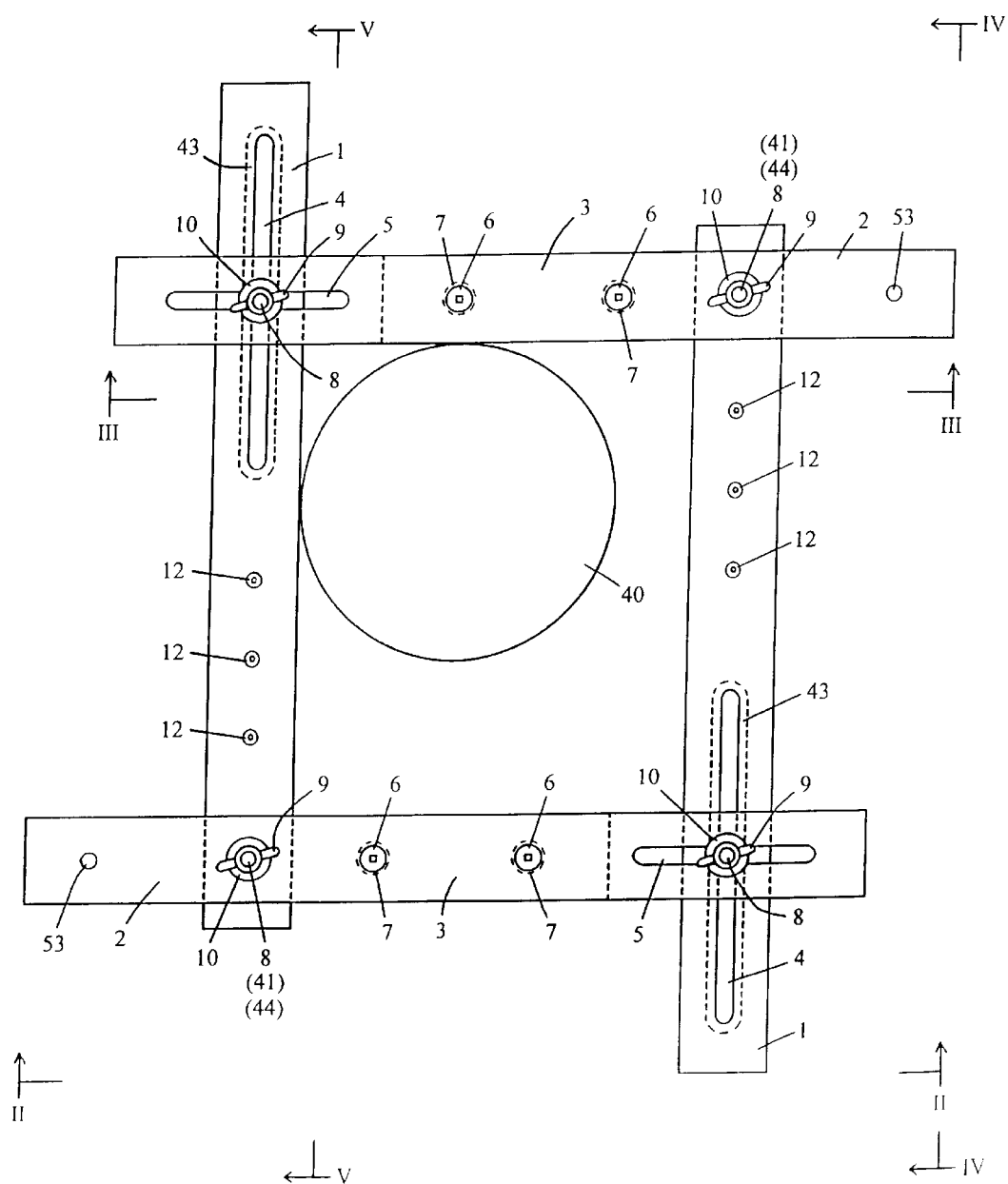
FIG. 2 shows another top view of the frame guide showing an outline of a circular router base and other details of the frame guide.
Figure 3:
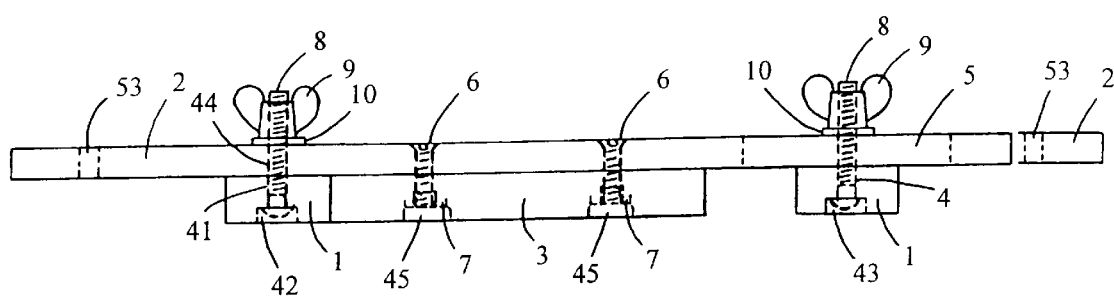
FIG. 3 shows a front view of the frame guide as viewed from position II—II indicated in FIG. 2.

FIGS. 1A and 1B show a standard frame guide with first frame members 1, and second frame members 2, secured together at four joints to form an enclosed rectangle. FIG. 2 shows the frame guide of FIGS. 1A and 1B enclosing an outline of a circular router base 40. FIG. 3 shows a front view of the frame guide shown in FIGS. 1A and 1B.

Referring to FIGS. 1A, 2 and 3, at a first end of each first frame member 1 is a first frame member hole 41. At a first end of each second frame member 2 is a second frame member hole 44. Each first frame member hole 41 is aligned with each second frame member hole 44 so that the holes 41, 44 overlap, and a connection means comprising an elongate screw shaft 8 is fastened through the first frame member and second frame member holes 41, 44, forming a fixed joint connection. The elongate screw shaft 8 fastens each first frame member 1 to each second frame member 2 by means of a threaded fastening member 9. Each first frame member hole 41 has a first frame member hole recessed area 42 underneath so that the head of the elongate screw shaft 8 does not project below the bottom surface of the first frame member 1. The elongate screw shaft 8 includes means to prevent its rotation when the threaded fastening member 9 is tightened or loosened. For example, a square shank adjacent the head of the elongate screw shaft 8 would fit into one end of each first frame member hole 41 which is squared to receive the square shank portion of the elongate screw shaft 8. One suitable elongate screw shaft 8 is a carriage bolt, which has such a square shank adjacent the head of the carriage bolt.

Still referring to FIGS. 1A, 2 and 3, at the other or second end of each first frame member 1, is a first frame member slot 4 through which another elongate screw shaft 8 is inserted. The first frame member slot 4 also has a first frame member slot recessed area 43 underneath, so that the head of the elongate screw shaft 8 does not project below the bottom surface of the first frame member 1 and can freely slide along the recessed area 43. The width of the first frame member slot 4 in each first frame member 1 is matched to the diameter of the elongate screw shaft 8 so that the elongate screw shaft 8 is securely located between the sides of the first frame member slot 4 and yet is able to slide freely along the length of the first frame member slot 4. In other words, the square shank portion of the elongate shaft fits loosely into a slot 4, and allows the elongate screw shaft 8 to slide along the length of the slot 4, but not rotate. Each second frame member 2 has a second frame member slot 5 at the opposite end to where the second frame member hole 44 is located, i.e. the second end of each second frame member. The elongate screw shaft 8 that is inserted through first frame member slot 4 also passes through the second frame member slot 5. Thus, each second frame member 2 is secured to each first frame member 1 by means of elongate screw shafts 8 using threaded fastening members 9.

As shown in FIGS. 1A and 1B, the first frame member slots 4 and second frame member slots 5 overlap each other and also are substantially at right angles with respect to each other. When the threaded fastening members 9 that secure first frame member slots 4 and second frame member slots 5 together are loosened, the length of each side of the enclosed rectangle can be adjusted. Advantageously, with the overlapping slots 4 and 5, the lengths of all sides of the enclosed rectangle may be adjusted simultaneously, without having to loosen the threaded fastening members 9 which are securing the first frame member holes 41 and second frame member holes 44. In other words, to adjust the length of the sides, it is only necessary to loosen two of the joints, thus simplifying adjustment.

Now referring to FIGS. 1B and 2, at the far end of each second frame member 2 is an alternate second frame member hole 53 which is an alternate location for the elongate screw shaft 8. This allows the first frame member 1 to be relocated with respect to the attached second frame member 2, and a larger enclosed rectangle can be formed. In the embodiment shown in FIG. 1B, the slot 4 in each first frame member 1 will allow the enclosed rectangle to be adjusted in the slot 4 direction from 6–12", which effectively provides a range of 0–6" for any routed rectangle when using a router having a 6" diameter base. Similarly, the slot 5 in each second frame member 2 will allow the enclosed rectangle to be adjusted in the slot 5 direction from 6–9", resulting in an effective range of 0–3" for any routed rectangle when using a router having a 6" diameter base. However, if the first end of each first frame member 1 is attached instead to the alternate hole 53 in each second frame member 2, then the enclosed rectangle can be adjusted in the slot 5 direction from 9–12", resulting in an effective range of 3–6" for any routed rectangle when using a router having a 6" diameter base.

The reason that the second frame member 2 adjustment direction is made in two stages is so that the base of the router 40 (FIG. 2) will not run off the ends of guide blocks 3 (detailed below), which will occur if the slots 5 were made longer than 3". This assumption is based on using a router having a standard router base diameter of 6".

Figure 4:
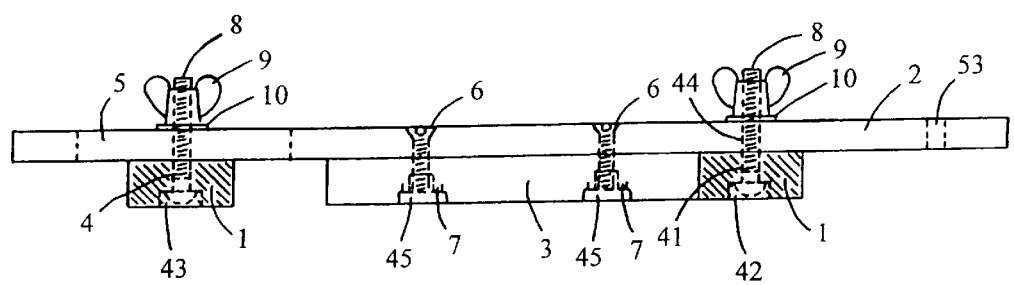
FIG. 4 shows a front cross-sectional view of the frame guide taken along the line III—III as indicated in FIG. 2.

Referring to FIGS. 3 and 4, attached underneath each second frame member 2 is a removable guide block 3 which has the same thickness as each first frame member 1, so that the bottom of the frame members 1 and guide blocks 5 are all flush and coplanar. The removable guide block 3 is fastened to the second frame member 2 by guide block fastening means 6 which here comprises flat-headed stove bolts 6, screwed into spiked T-nuts 7 located in recessed areas 45 underneath each guide block 3.

Figure 5:
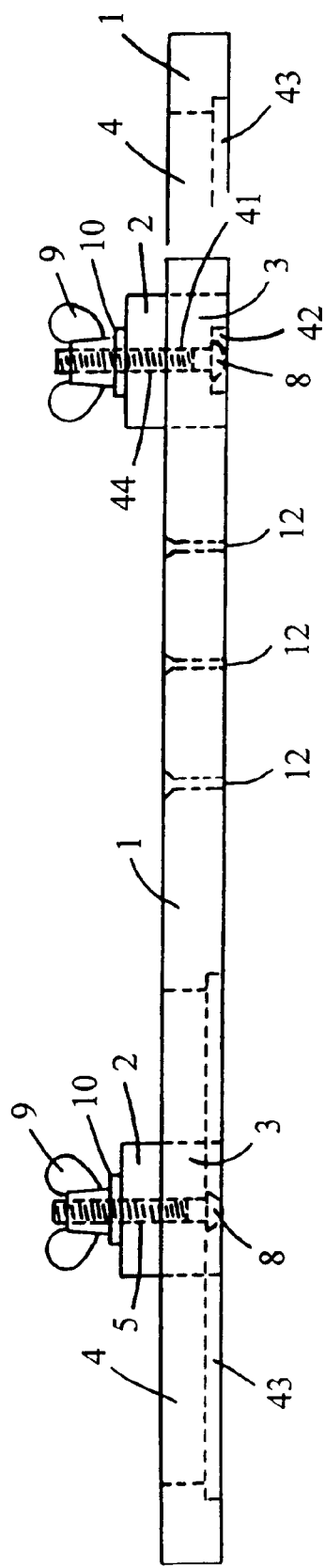
FIG. 5 shows a side view of the frame guide as viewed from position IV—IV indicated in FIG. 2.
Figure 6:
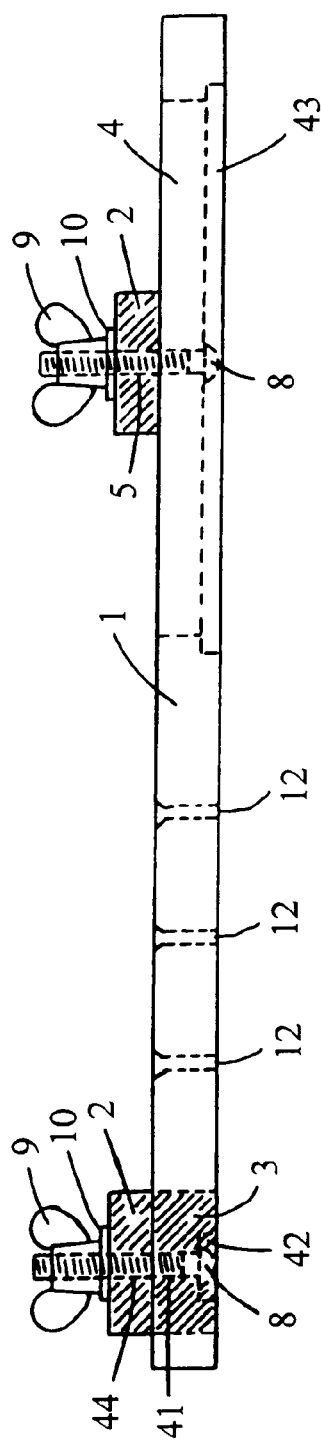
FIG. 6 shows a side cross-sectional view taken along the line V—V indicated in FIG. 2.

Referring to FIG. 5 and 6, when it is not possible or practical to clamp the frame guide onto the workpiece, then small countersunk holes 12 in each of the first frame members 1 may be used to screw down the frame guide onto the workpiece if necessary. The frame guide thus can be clamped or alternatively screwed down onto sheet materials or onto boards of any size. This includes surfaces which are vertical or are angled at other than horizontal. In addition, the first and second fence members of the frame guide are directly calibrated so that they can be precisely set prior to use, or they can be custom set to match any markings that are on the workpiece. The standard frame guide as described above can be used to rout any size or shape of rectangle up to 6"×6" but any size of frame guide can be made using the same principles, as explained below.

Figure 7A:
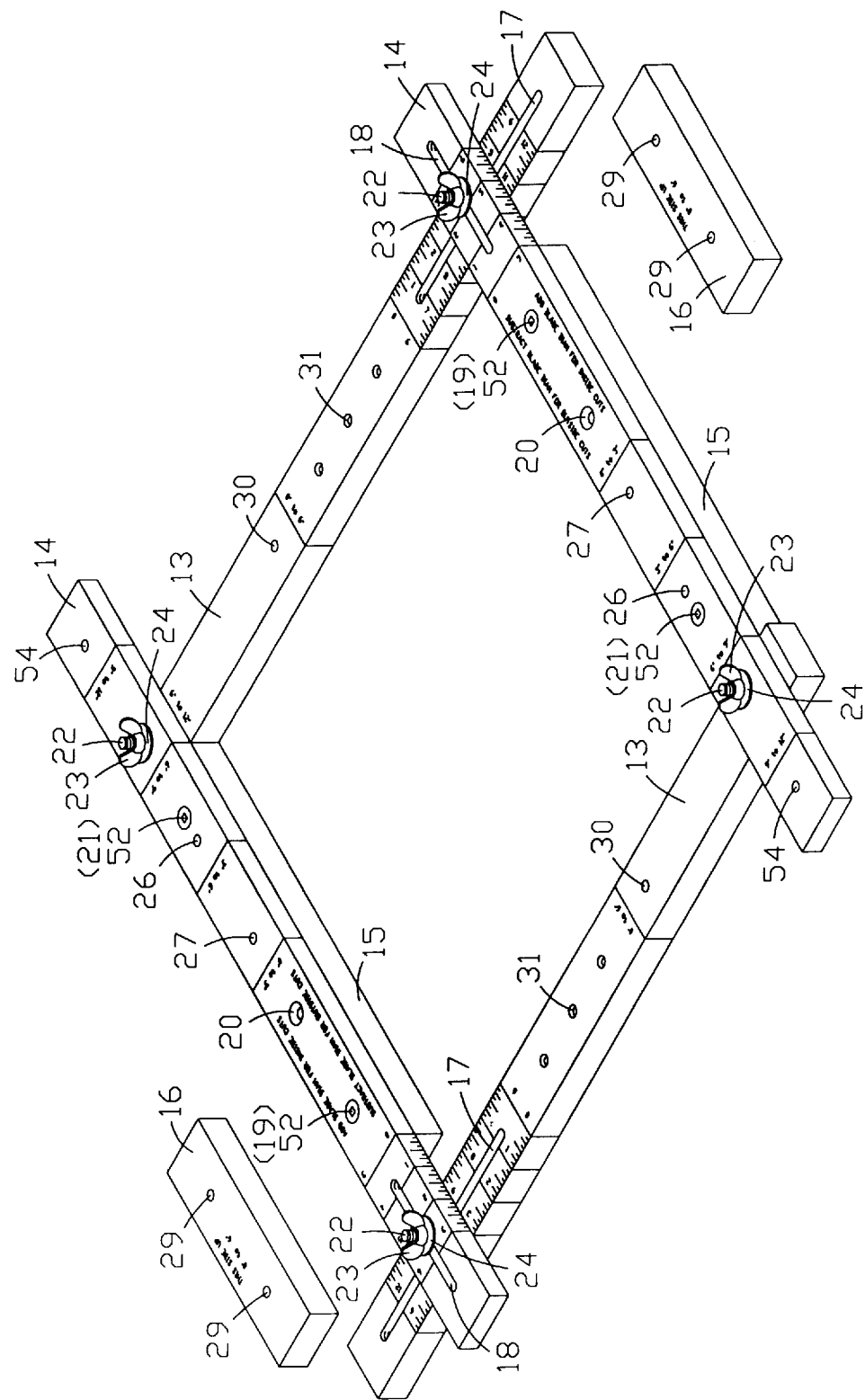
FIG. 7A shows a perspective view of a second, larger embodiment of the frame guide of the present invention.
Figure 7B:
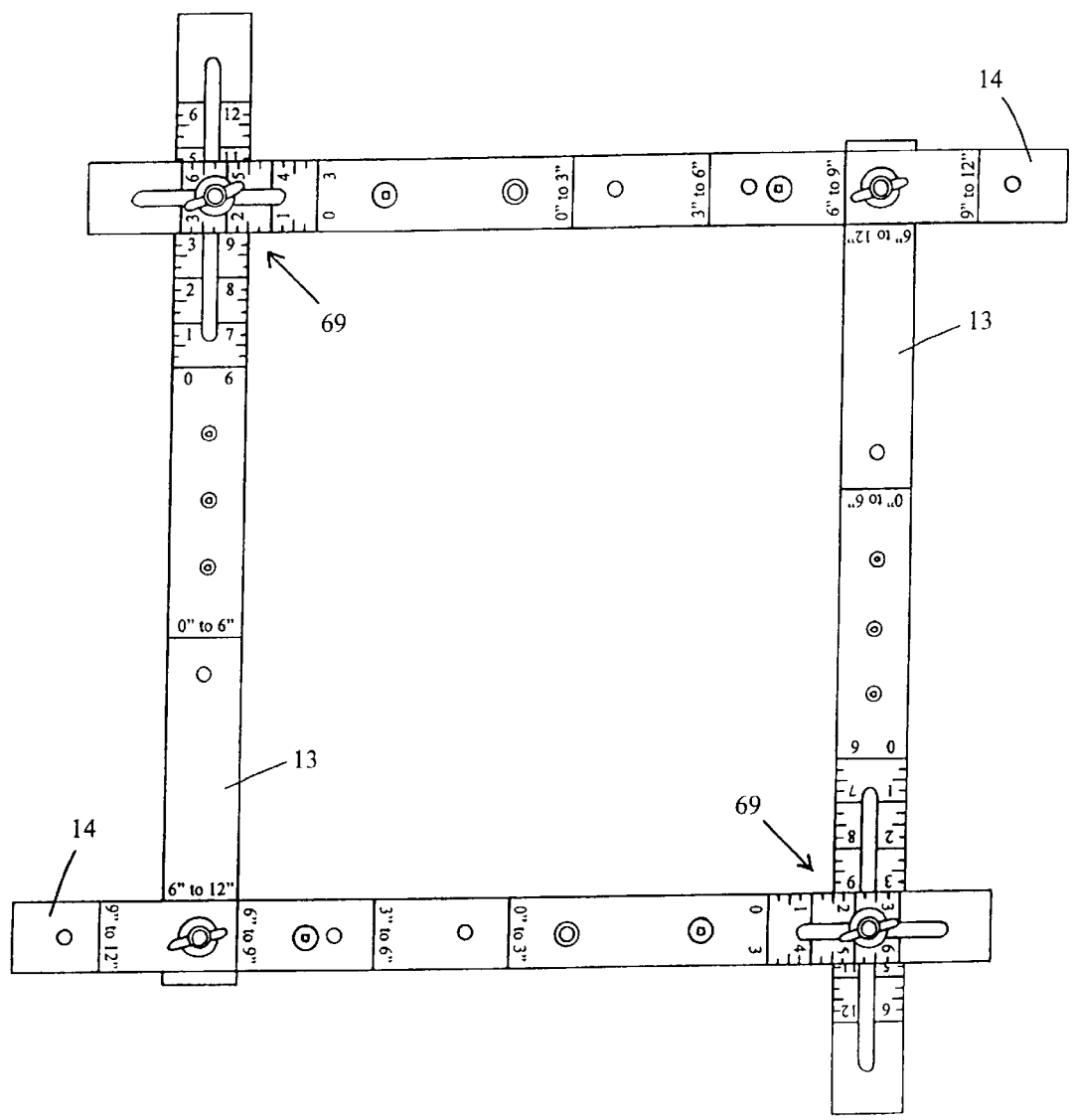
FIG. 7B shows a top view of the second, larger embodiment of the frame guide shown in FIG. 7A.
Figure 8:
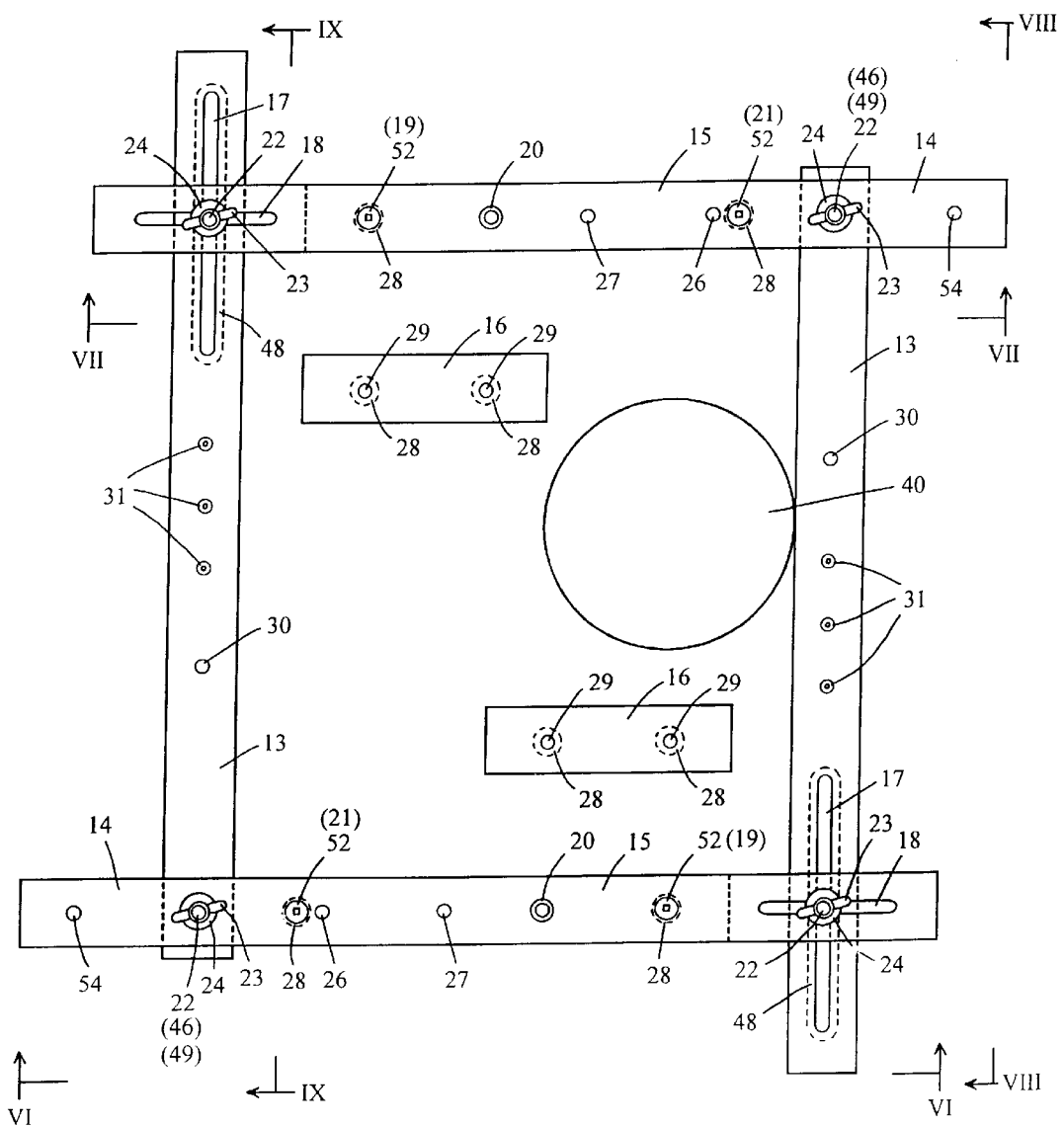
FIG. 8 shows another top view of the second, larger embodiment frame guide showing an outline of a circular router base.

FIGS. 7A, 7B and 8 show a perspective view and top views of a larger embodiment of a frame guide which uses the same principles as described for the standard frame guide. In this case, first frame members 13 and second frame members 14 are made longer than their counterparts in the standard frame guide so that a larger enclosed rectangle is possible within which the base of a hand-held router 40 is operated and controlled. At a first end of each first frame member 13 is a first frame member hole 46 which includes a first frame member hole recessed area 47 (shown in FIG. 11) underneath so that an elongate screw shaft 22 can be inserted without having its head projecting below the bottom surface of the first frame member 13. The elongate screw shaft 22 includes means to prevent its rotation when the threaded fastening member 23 is tightened or loosened, as described earlier with respect to elongate screw shaft 8. A second first frame member hole 30 is identical to the first frame member hole 46, except that the second first frame member hole 30 is located closer to the middle of the first frame member 13, and also accepts the elongate screw shaft 22. The second first frame member hole 30 also has a recessed area 51 (shown in FIG. 11) underneath to accommodate the head of an elongate screw shaft 22.

Referring to FIG. 8, with the larger embodiment of the frame guide, each second frame member 14 has a selection of four second frame member mounting holes 27, 26, 49, and 54 to choose from. Also, with the larger embodiment of the frame guide, as explained, each first frame member 13 has two first frame member mounting holes 30, 46 to choose from. The elongate screw shaft 22 located at the first ends of first frame member 13 and second frame member 14 will pass through one of the first frame member mounting holes 30, 46 and one of the second frame member mounting holes 27, 26, 49, and 54. This selection of mounting holes increases the range of adjustments of the larger version of the frame guide.

At a second end of each first frame member 13 is a first frame member slot 17. Also, similar to the first embodiment, the first frame member slot 17 has a first frame member slot recessed area 48 underneath so that the head of elongate screw shaft 22 does not project below the bottom surface of the first frame member 13. The width of each first frame member slot 17 is matched to the diameter of the elongate screw shaft 22 so that the elongate screw shaft 22 is located between the sides of the first frame member slot 17 and yet is able to slide freely along the length of the first frame member slot 17. Also, the elongate screw shaft 22 includes means to prevent its rotation when the threaded fastening member 23 is tightened or loosened, as described earlier with respect to elongate screw shaft 8 located in the first frame member slot 4.

The elongate screw shaft 22 that is situated in the first frame member slot 17 also passes through a second frame member slot 18. Thus, each second frame member 14 is fastened to each first frame member 13 by means of the elongate screw shaft 22 using threaded fastening member 23.

Figure 9:
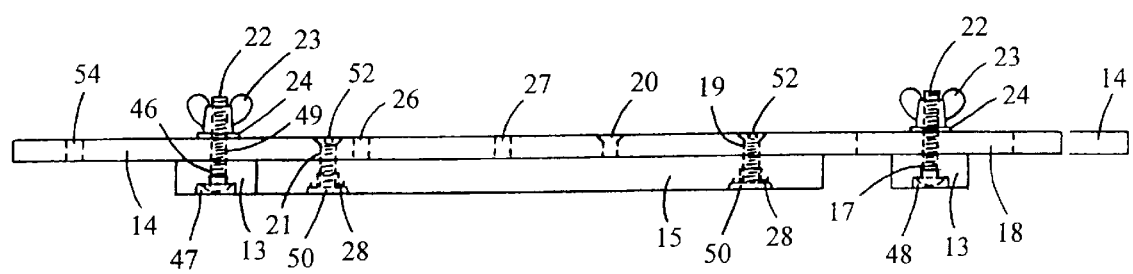
FIG. 9 shows a front view of the second, larger embodiment frame guide as viewed from position VI—VI indicated in FIG. 8.
Figure 10:
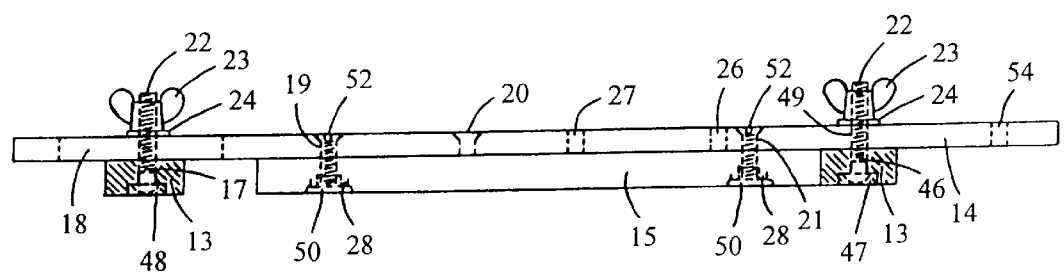
FIG. 10 shows a front cross-sectional view of the second, larger embodiment frame guide taken along line VII—VII as indicated in FIG. 8.

Now referring to FIG. 9, attached underneath each second frame member 14 is a removable long guide block 15 which has the same thickness as each first frame member 13. The long guide block 15 is fastened to the second frame member 14 by guide block fastening means which comprises two flat-headed stove bolts 52. These stove bolts 52 are located in countersunk holes 19 and 21 and screw into spiked T-nuts 28 which are located in recessed areas 50 underneath each of the long guide blocks 15.

Alternatively, instead of attaching the long guide blocks 15 underneath each second frame member 14, a short guide block 16 (shown in FIG. 8) can be installed. This time, the countersunk holes 19, 20 are used and the stove bolts 52 screw into the threaded holes 29 of the spiked T-nuts 28 which are located in recessed areas underneath each of the short guide blocks 16.

Figure 11:
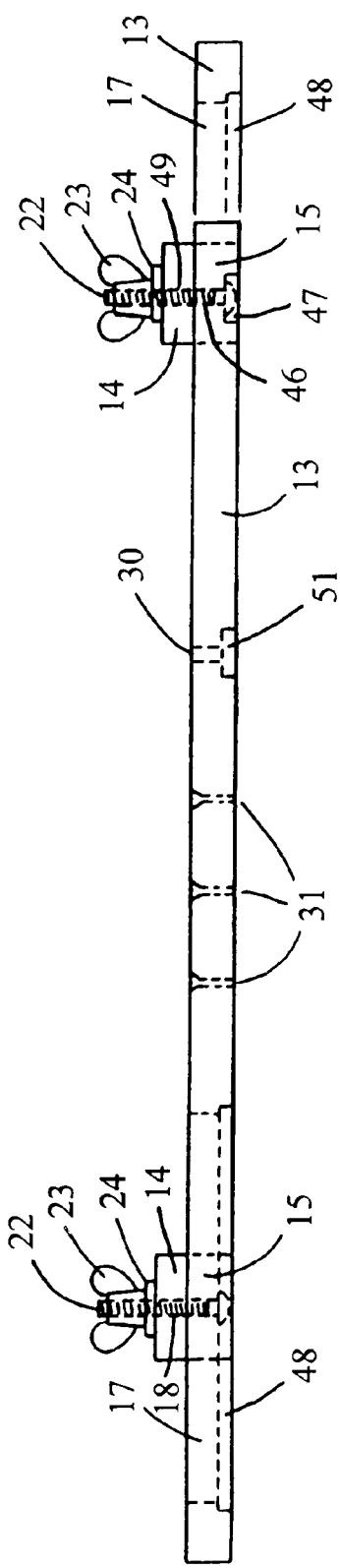
FIG. 11 shows a side view of the larger version frame guide as viewed from position VIII—VIII indicated in FIG. 8.
Figure 12:
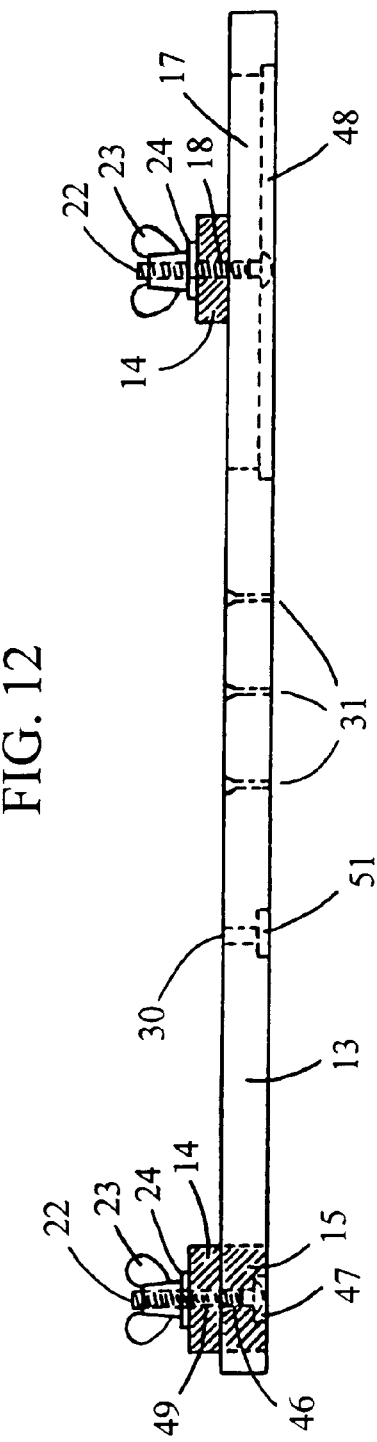
FIG. 12 shows a side cross-sectional view taken along line IX—IX indicated in FIG. 8.

Now referring to FIGS. 8, 11, and 12, each first frame member 13 includes a plurality of small countersunk holes 31 which may be used to fasten this larger version of the frame guide onto a workpiece, whenever it is not possible to clamp the frame guide down.

The removable long guide blocks 15 may be used whenever the first ends of the first frame members 13 are connected to the outer two second frame member mounting holes 49, 54. The removable short guide blocks 16 may be used whenever the fixed ends of the first frame members 13 are connected to the inner two second frame member mounting holes 26,27.

The selection of one of four second frame member mounting holes 27, 26, 49 and 54 in each of the second frame members 14 will enable adjustment of the enclosed rectangle of the frame guide to be adjusted in that direction in the following steps: 6–9", 9–12", 12–15", and 15–18". The effective range when using a router having a 6" diameter base, is: 0–3", 3–6", 6–9", and 9–12".

The selection of one of two first frame member mounting holes 30, 46 in each of the first frame members 13, will allow the enclosed rectangle of the larger version frame guide to be adjusted in that direction either from 6–12", or from 12–18", resulting in an effective range of 0–6" or 6–12", when using a router having a 6" diameter base. It will be noted that the actual size of the routed rectangle will vary with the size of the router bit which is used, and that the stated dimensions make reference to the center point of the router bit path.

Advantageously, if neither of the long guide blocks 15 nor the short guide blocks 16 are attached underneath each second frame member 14, then the larger version rectangular frame guide may be tilted at an angle to form a parallelogram shape. In addition, referring back to FIGS. 3 and 4, by removing guide blocks 3 from underneath the second frame members 2, the standard frame guide shown in FIGS. 3 and 4 can also be tilted at an angle to form a parallelogram shape. Furthermore, if parallel sides are not desired, either size of frame guide can form a trapezoid. When used in this manner, it is necessary to also loosen the elongate screw shafts 8, 22 at each of the first ends of the frame guides. However, it will be noted that by removing the guide blocks 3, 15, 16, those sides from which the guide blocks are removed no longer provide a guide edge for the router base plate. Consequently, special accessories are required when the frame guides are tilted to form a parallelogram or trapezoid shape.

Figure 17:
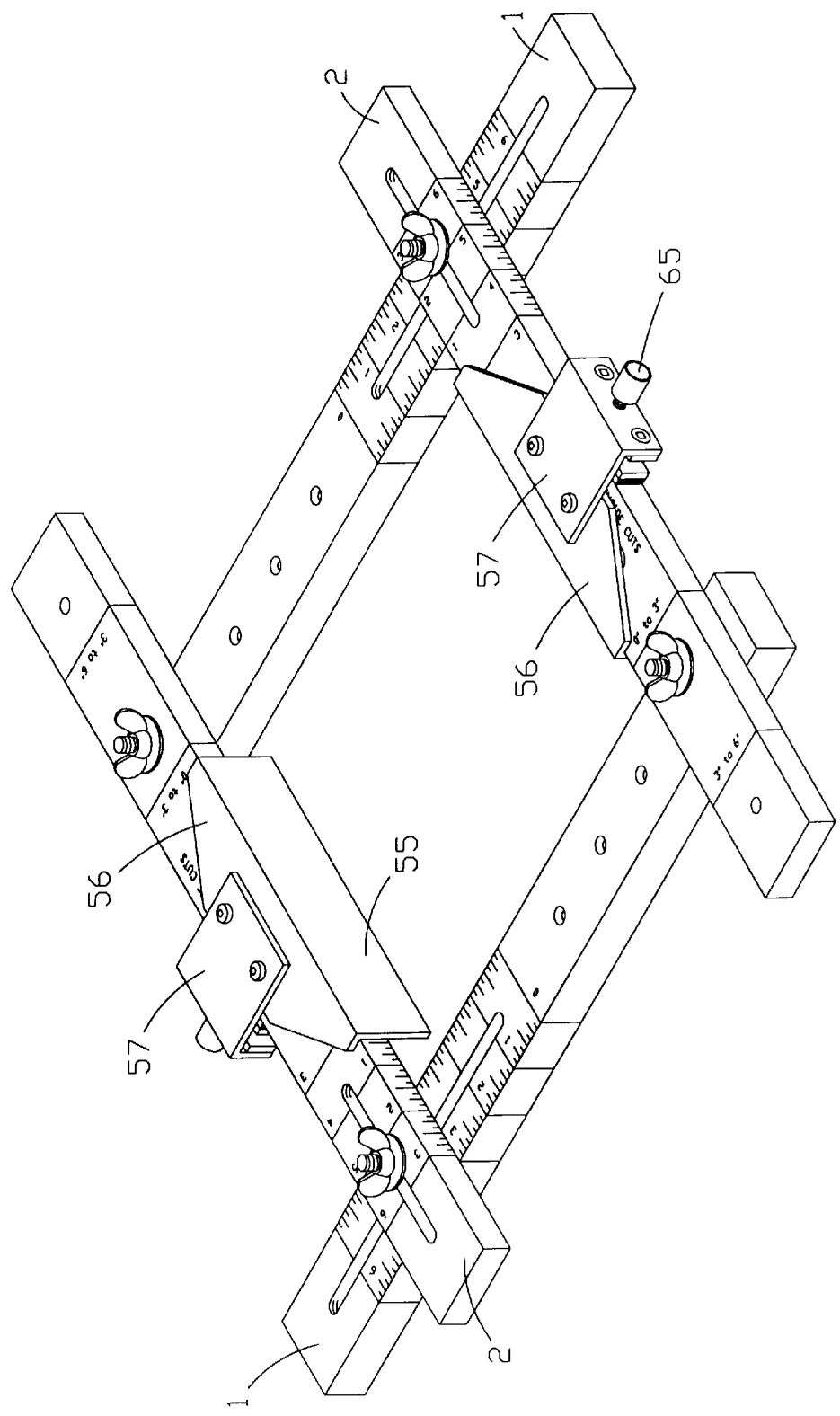
FIG. 17 shows how the short version of the adjustable guide flange is attached to the frame guide.
Figure 18:
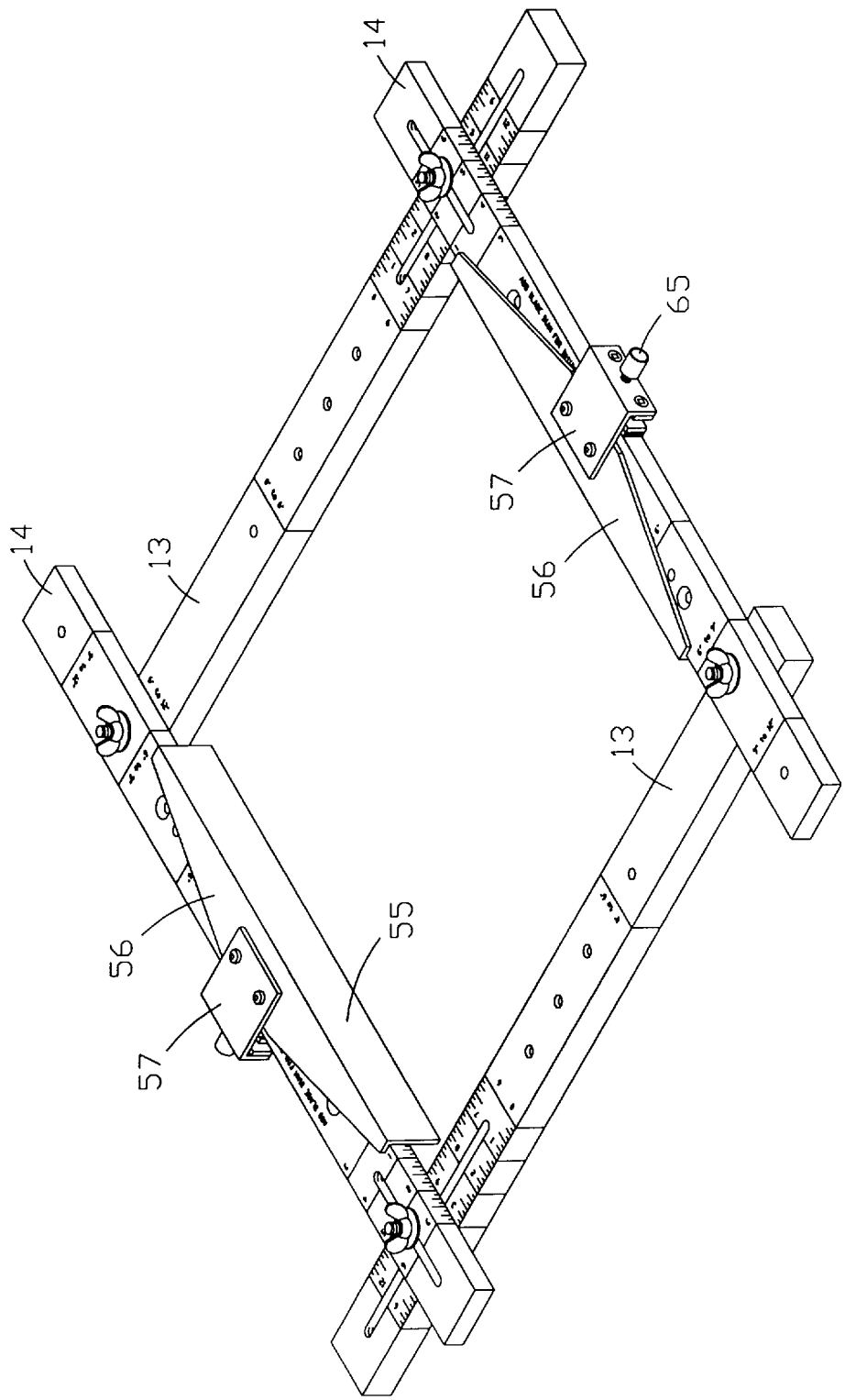
FIG. 18 shows how the long version of the adjustable guide flange is attached to the larger version of the frame guide.

Now referring to FIGS. 14A–14D, 15A–15D and 16A–16B, two sizes of these special accessories, which may be called adjustable guide flanges, are shown in detail. For either version of the adjustable guide flange, a vertical flange portion 55 performs the function that is normally provided by the short or long guide blocks 3, 15, 16. The short and long adjustable guide flanges are clamped onto the second frame members 2, 14 as shown in FIGS. 17 and 18. It will be noted that each vertical flange portion 55 abuts the inner edge of each of the second frame members 2, 14 and the lower edge of each vertical flange portion 55 is generally coplanar with the lower surfaces of the first frame members. Furthermore, it will be noted that the adjustable guide flanges can be moved to any location along the second members 2, 14 to suit the requirement of the angles of the parallelogram or trapezoid being cut.

The length of the adjustable guide flanges would be selected to suit the length of the side of the parallelogram or trapezoid that is to be routed. The short adjustable guide flange is used for side length of 0–6", and the long version of the adjustable guide flange is used for side length of 6–12". Either version of the adjustable guide flange is attached onto the clamp assembly section 57 by means of round-headed machine screws 59. The clamp assembly section 57 will attach to either size of the flange section 56.

These adjustable guide flanges will guide the router along the second frame members 2, 14 when properly positioned. The adjustable guide flanges must be positioned such that the router baseplate will not travel beyond either end of the vertical flange portion 55.

It will be noted that, when the frame guides are used to rout parallelograms or trapezoids, the calibration markings on the first and second members are no longer valid. Also, the maximum length of side for parallelograms, compared to the maximum length of side for squares and rectangles, would be reduced by a certain amount, depending on the acute angles contained within the parallelogram. For example, tests have shown that the maximum side length for routing parallelograms with 75° angles is reduced by about ⅝". For parallelograms with 60° angles, the maximum side length is reduced by about 1⅛". For parallelograms with 45° angles, the maximum side length is reduced by about 3¼".

In summary, the standard frame guide would have approximately the following maximum side lengths: for 90°, 6"×6"; for 75°, 5⅜"×5⅜"; for 60°, 4⅞"×4⅞"; and for 45°, 2¾"×2¾". For the larger version of the frame guide, the approximate maximum side lengths would be as follows: for 90°, 12"×12"; for 75°, 11⅜"×11⅜"; for 60°, 10⅞"×10⅞"; and for 45°, 8¾"×8¾".

Figure 16A:
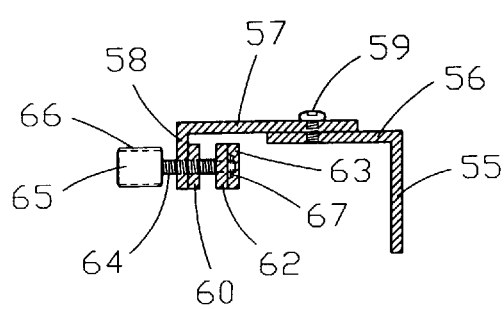
FIG. 16A shows a side cross-sectional view of the short or long version adjustable guide flange taken along the line X—X in FIGS. 14D and 15D.
Figure 16B:
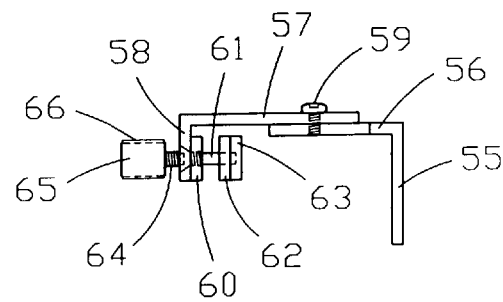
FIG. 16B shows a side view of either the short or long version of the adjustable guide flange.

Referring now to FIGS. 16A and 16B, either the short or long flange section 56 is attached by round-headed machine screws 59 to the clamp assembly section 57, which is perpendicularly attached to the clamp bracket 58. Located inside the front section of the clamp bracket 58 is a steel plate 60, which is fastened to the clamp bracket 58 by means of special flat-headed machine screws 61 that have small diameter pin extensions on them. At each end of the clamping plate 62 are guide holes that slide along the small diameter pin extensions of the special flat-headed machine screws 61. An adjustable screw 64 is screwed into a threaded hole in the center of the steel plate 60 which has a matching clearance hole in the clamp bracket 58. Attached to the adjustment screw 64 is an adjustment knob 65, which has tight-fitting rubber tubing 66 around it for better grip. The other end of the adjustable screw 64 is machined so that it has a small diameter pin extension with a circlip groove in it. The small diameter pin extension of the adjustment screw 64 passes through a matching clearance hole in the center of the clamping plate 62. A washer and circlip 67 are then installed to link them together. Rubber pads 63 are glued onto the forward side of the clamping plate 62 to act as buffers.

Figure 13:
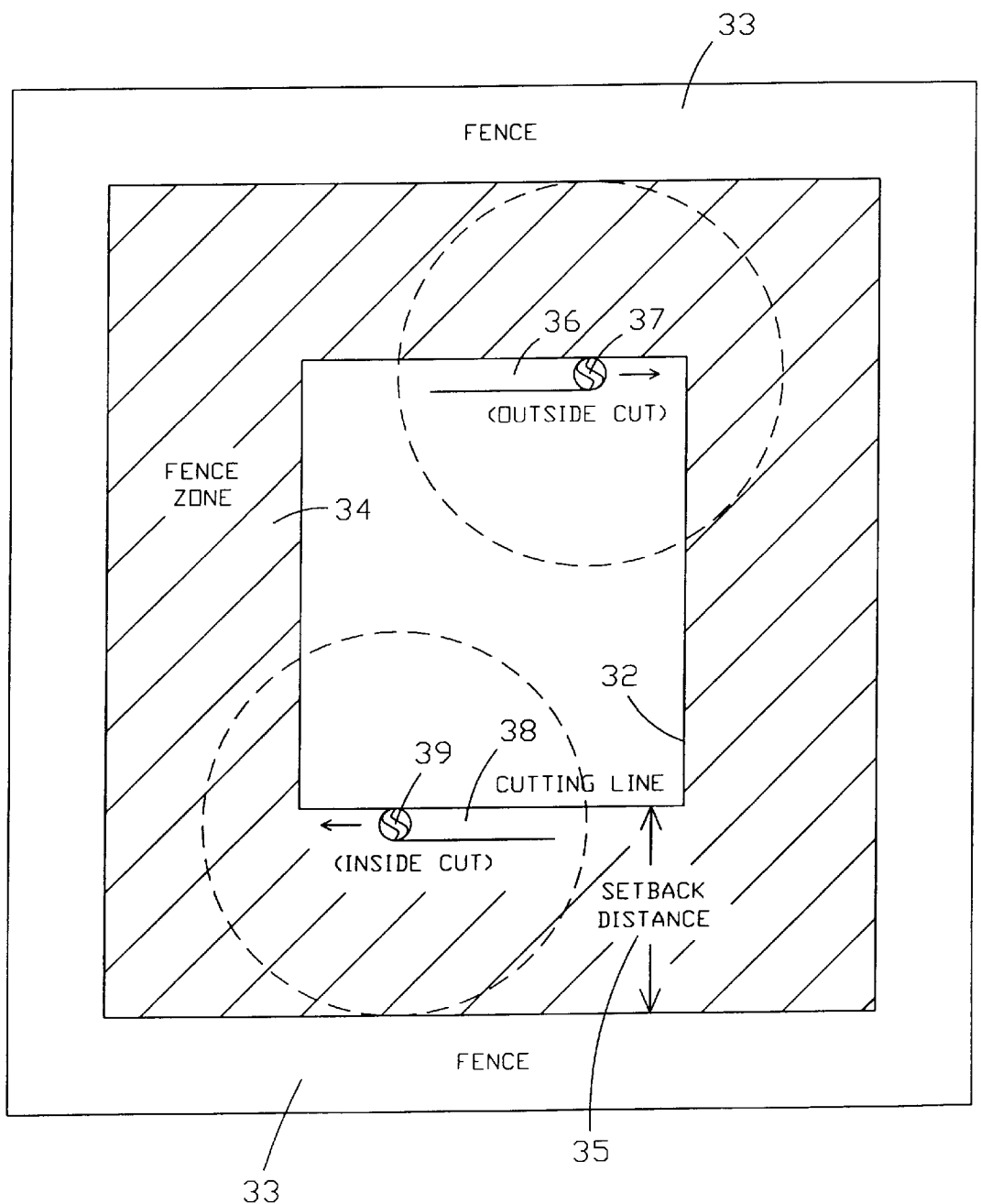
FIG. 13 shows an illustration of the principles of operation of the present invention.
Figure 14C:
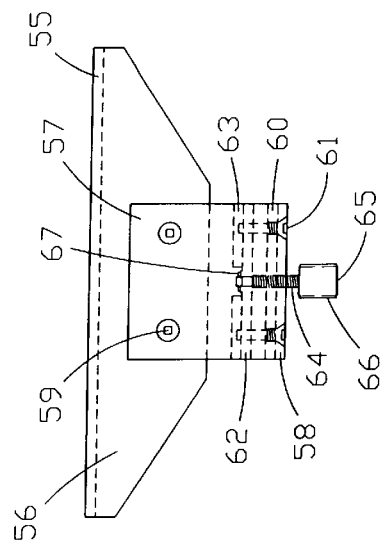
FIGS. 14A–14D show an exploded isometric view, an assembled isometric view, a top view and a front view, respectively, of a short version of an adjustable guide flange.
Figure 14D:
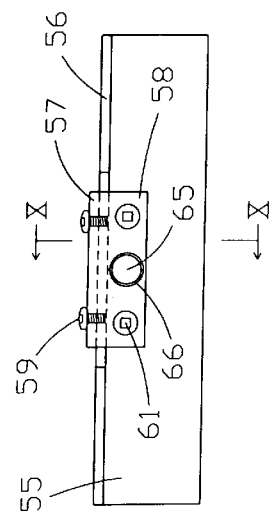
Figure 14A:
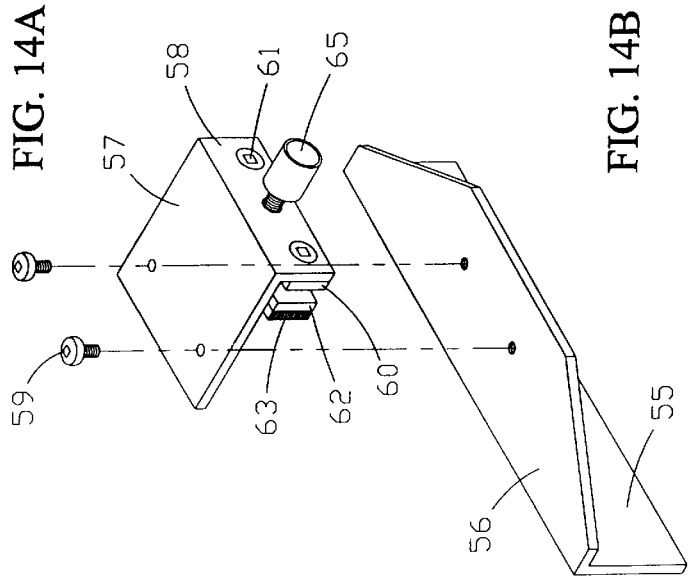
Figure 14B:
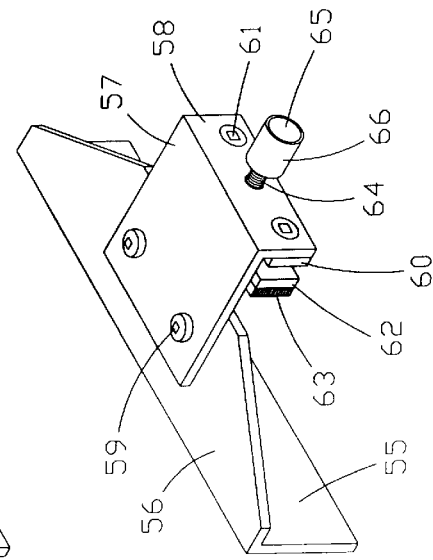
Figure 15A:
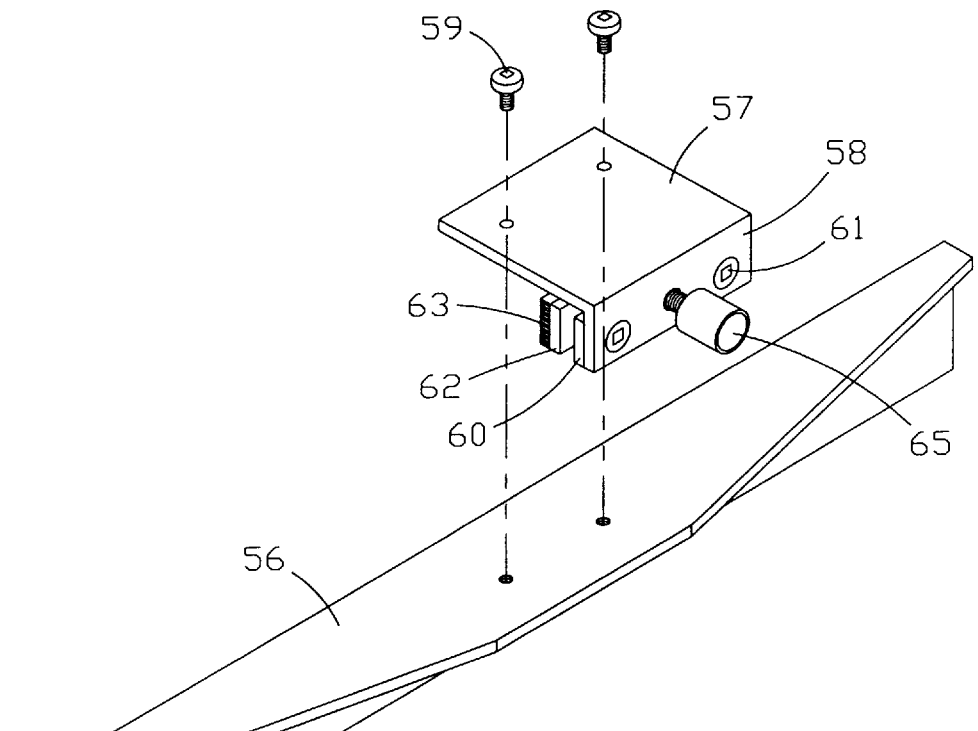
FIGS. 15A–15D show an exploded isometric view, an assembled isometric view, a top view and front view, respectively, of a long version of an adjustable guide flange.
Figure 15B:
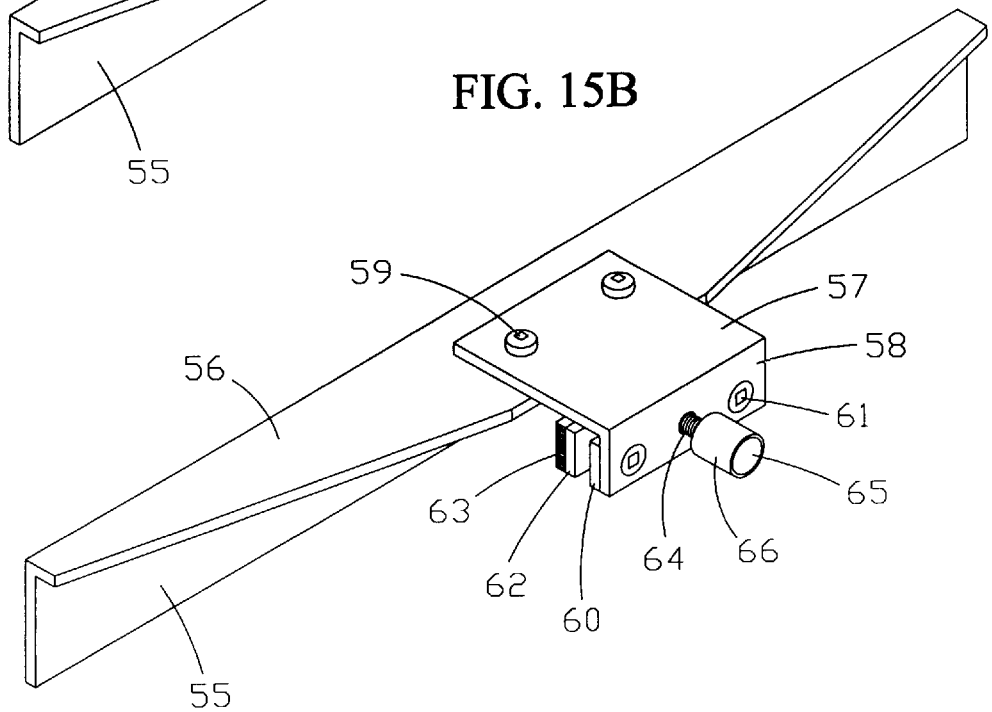
Figure 15C:
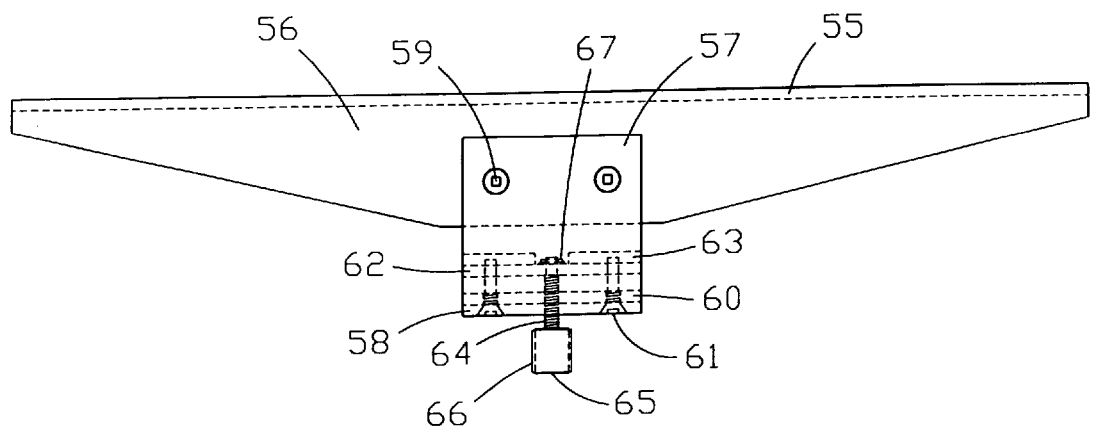
Figure 15D:
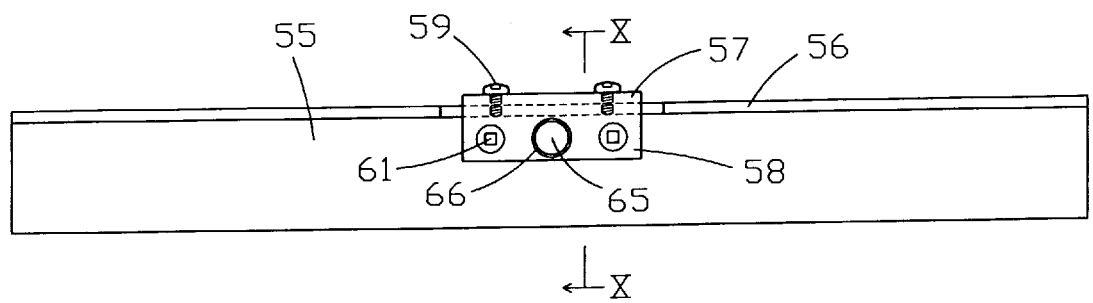

Now referring to FIG. 13, a preferred practice when using the frame guide described in this disclosure is provided. When using the frame guide, it is necessary to first decide what the dimensions of the proposed rectangular groove or slots will be. The calibrations on each of the frame members actually indicates where the centre of the router blade would be on the cutting line 32 of the proposed rectangle. The diameter of the router blade would have to be either added to, or subtracted from, the desired dimensions of the rectangle that is to be routed. Referring back to FIG. 1B, the calibration points of the first and second frame members are indicated by the two arrows 55. In FIG. 1B, the first frame members 1 are set at 3". The second frame members 2 are set at 1½" because the first and second frame member mounting holes are set at the 0–3" range.

Now referring to FIG. 13, the four frame members of the frame guide are represented by a rectangular border 33. A cutting line 32 represents the proposed rectangle that is to be routed on the workpiece. The four frame members 33 of the frame guide each have to be positioned a specific distance away from the cutting line 32 on the workpiece. This distance is called the setback distance 35. The area that lies between the four frame members of the frame guide 33 and cutting line 32, is called a fence zone 34, which is represented by the shaded area.

If a groove 36 cut by the router bit 37 is required to be on the side of the cutting line 32 that is not inside the fence zone 34, then it is called an "outside cut". This would require that the diameter of the router bit 37 be subtracted from each dimension of the proposed rectangle before setting the calibrated dimensions of the frame guide.

However, if a groove 38 cut by a second router bit 39 is required to be on the side of the cutting line 32 that is inside the fence zone 34, then it is called an "inside cut". This would require that the diameter of the router bit 39 be added to each dimension of the proposed rectangle before setting the calibrated dimensions of the frame guide.

After the frame guide frame members have been adjusted correctly, the frame guide can be placed on the workpiece and precisely lined up with the cutting line by using setback gauges, in either an inside cut or outside cut direction, as described in the inventor's copending patent application Ser. No. 09/207,759. The frame guide would then be clamped down, using either C-clamps or short bar clamps. Alternatively the frame guide can be screwed down onto the workpiece using the small countersunk holes 12, 31 in the first frame members of either version of the frame guide. The frame guide should be clamped or screwed down on at least two different fences to ensure that no shifting occurs during routing. Note that where adjustable guide flanges are used, to cut a parallelogram, then the frame guide must be secured by the first frame members 1 and 13 only, as the guide blocks 3, 15, 16 will not be present under the second frame members 2, 14. Also the frame guide should be checked for squareness before being fastened down, unless being used to form a parallelogram or trapezoidal shaped frame.

The actual routing should always be in a clockwise direction around each of the four frame members of the frame guide, regardless of whether it is to be an "outside cut" or an "inside cut", to rout a groove around the perimeter of the proposed rectangle on the workpiece. This ensures that the normal forces produced by routing urge or press the router against the frame. If the cut is to be a recessed area, rather than just a quadrilateral slot, after the perimeter has been cut in a clockwise direction, the central area can be routed in a random manner.

Any size of router bit may be used with the frame guide, although larger sizes will provide more noticeably rounded corners and result in larger quadrilaterals than smaller sizes.

The standard frame guide (shown in FIGS. 1A and 1B) can enable the routing of rectangles from virtually 0 up to 6" in both directions, but larger versions are possible. The larger version frame guide (shown in FIGS. 7A and 7B) can enable the routing of rectangles from virtually 0 up to 12" in both directions, which can be achieved by using a series of mounting positions that are available at the first ends of both the first and second frame members.

Referring back to FIG. 7B, the larger frame guide has the calibration points of the first and second frame members 13, 14 at the locations indicated by the two arrows 56. In FIG. 7B, the first frame members are set at 9" because their first ends are connected in the 6–12" position. The second frame members 14 are set at 7½", because their first ends are connected in the 6–9" position.

While particular embodiments of the present invention have been illustrated and described, it would be obvious to those skilled in the art that various changes and modifications can be made without departing from the spirit and scope of the invention. It is therefore intended to cover in the claims all of such changes and modifications that are within the scope of this invention. For example, while an elongate screw shaft is used as the connection means to connect first and second frame members, other similar connection means may be substituted. Furthermore, it is possible to replace a first frame member and a second frame member with an L-shaped two-sided frame member, thus reducing the number of connections from four down to two. Of course, in this embodiment, it would not be possible to tilt the frame to form a parallelogram shape. It is envisaged that the frame members could be molded from a plastic material, although hardwood is preferred, any other suitable material may be used.

I claim:

1. An adjustable frame guide, defining a quadrilateral, having a first pair of sides and a second pair of sides with each second side extending between the first sides, the quadrilateral being for guiding a router having a base for sliding movement relative to the frame guide, the frame guide comprising:

a pair of first frame members extending along the first sides of the quadrilateral, each first frame member having first and second ends;

a pair of second frame members extending along second sides of the quadrilateral and each second frame member having first and second ends;

a joint formed between the first end of one first frame member and the first end of one second frame member, a joint formed between the first end of the other first frame member and the first end of the other second frame member, a joint formed between the second end of said one first frame member and the second end of said other second frame member and a joint formed between the second end of said other first frame member and the second end of said one second frame member, the first and second frame members overlapping at the joints; and a connection means provided at each joint, wherein, the connection means include slots in each of said frame members at respective second ends thereof, each of said slots forming an elongate aperture through one of said frame members at said respective second ends, said slots overlapping and intersecting at said joints formed at said second ends and, wherein, said connection means enable the frame members to be rigidly secured together and enable at least the length of each side of the quadrilateral to be adjusted.

2. An adjustable frame guide as claimed in claim 1, wherein each of the first and second frame members includes a hole at respective first ends thereof, whereby there is one pair of joints with overlapping slots and another pair of joints with overlapping holes, said overlapping holes providing an inextendable joint, and said overlapping slots providing an adjustable joint enabling simultaneous adjustment of the lengths of all sides of said adjustable frame guide.

3. An adjustable frame guide as claimed in claim 2, wherein the connection means, at each joint, includes an elongate shaft and clamping means for clamping overlapping ends of said first and second frame members together, the elongate shafts extending through said holes and said slots, to align said first and second frame members.

4. An adjustable frame guide as claimed in claim 3, wherein the elongate shafts comprise screw shafts, and wherein the clamping means comprises, for each joint, a screw head at one end of a corresponding screw shaft and a threaded fastening member rotatably mounted on the screw shaft at the other end thereof.

5. An adjustable frame guide as claimed in claim 4, wherein the second frame members extend over the top of the first frame members, whereby said first and second frame members do not obstruct one another, to enable free angular movement between said first and second frame members.

6. An adjustable frame guide as claimed in claim 5, wherein the first frame members are generally elongate and include lower surfaces for abutting a workpiece and are of substantially uniform cross-section, and the second frame members are generally elongate and of substantially uniform cross-section and extend above said first frame members, and wherein a guide block is mounted below each second frame member, said guide block having a lower surface generally coplanar with the lower surfaces of first frame members and an inner vertical surface generally coplanar with the inner vertical surface of each corresponding second frame member.

7. An adjustable frame guide as claimed in claim 6, wherein the first ends of at least the first frame members include a plurality of spaced apart holes aligned lengthwise along each corresponding first frame member, the holes being spaced apart by a distance substantially equal to the length of the slot of the corresponding frame member, to provide additional adjustment by selection of one of the holes for forming the corresponding joint.

8. An adjustable frame guide as claimed in claim 7, wherein the second frame members include a plurality of holes at the first ends thereof, said holes being aligned lengthwise along each corresponding second frame member, and wherein there is provided a plurality of guide blocks of different length and each guide block can be removably mounted to one of the second frame members, the length of the guide block being selected in dependence upon the hole selected for each second frame member to form a joint at the second end thereof.

9. An adjustable frame guide as claimed in claim 8, wherein each guide block is provided with an end surface perpendicular to the corresponding second frame member and located relative to one hole of a second frame member such that, when a joint is formed at that hole with a first frame member, that first frame member abuts the end surface of the guide block and is held perpendicularly to the second frame member.

10. An adjustable frame guide as claimed in claim 9, wherein the bottom surface of each first frame member is provided with a recessed shelf around the slot thereof, for accommodating the corresponding screw head and wherein each threaded fastening member includes manual engagement means, to permit manual tightening of the clamping means.

11. An adjustable frame guide as claimed in claim 10, wherein scales are provided along each slot, said scales intersecting at said adjustable joints, to indicate the relative length of each side of the quadrilateral that is to be routed.

12. An adjustable frame guide as claimed in claim 6, wherein the guide block comprises an adjustable guide flange, the adjustable guide flange being mounted on each second frame member and having a vertical flange portion abutting an inner edge of each second frame member and having a lower edge generally coplanar with the lower surfaces of the first frame members, wherein the adjustable guide flanges are adjustably mounted to the second frame members, whereby the location of the adjustable guide flanges can be adjusted to accommodate different angular orientation between the first and second frame members.

* * * * *